Oct. 4, 1938.  M. H. MERCHANT  2,132,360
VAPORIZING AND OXIDIZING PHOSPHORUS
Filed May 19, 1936
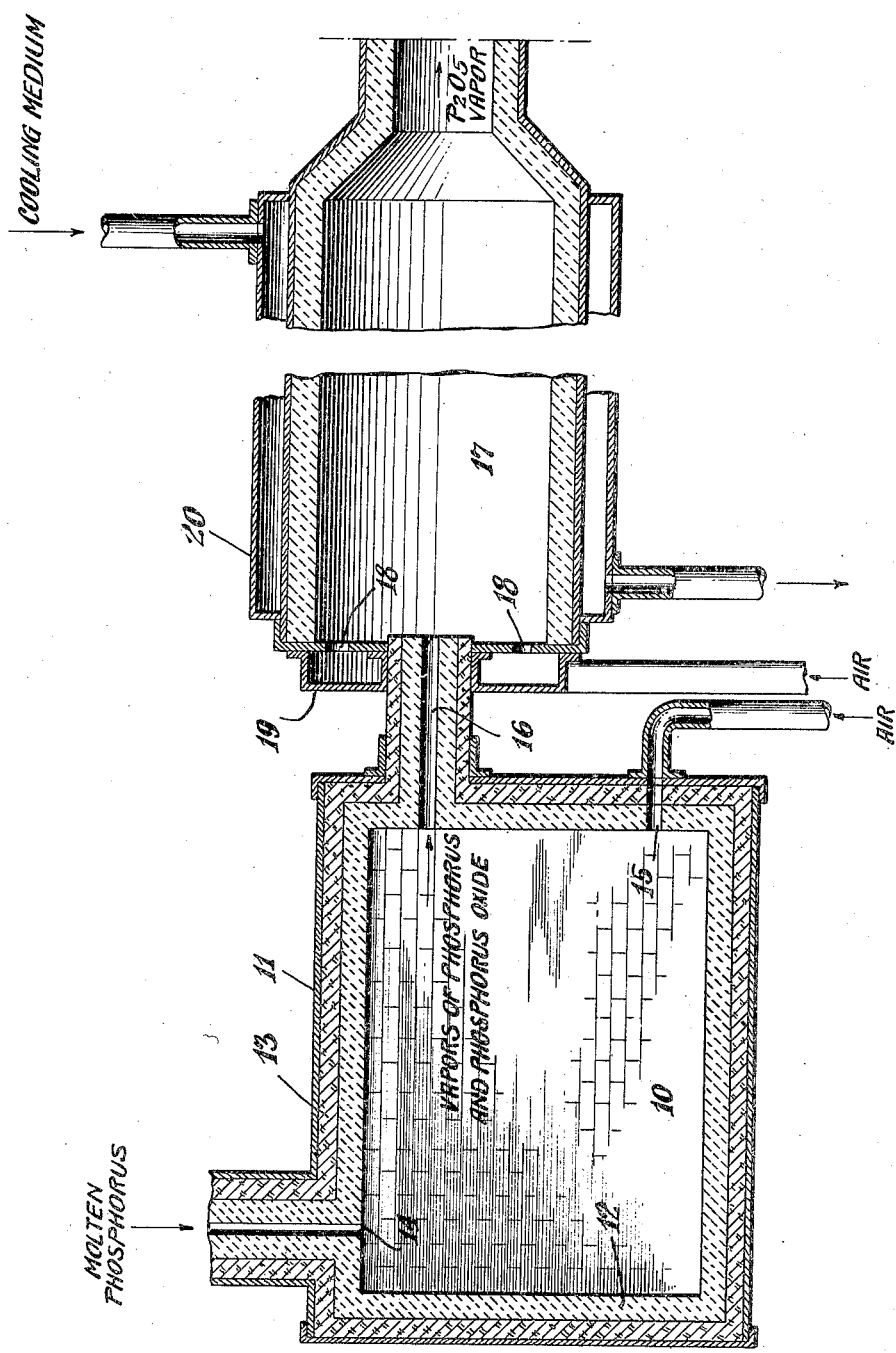
INVENTOR
Milton H. Merchant
BY
Cooper, Kerr & Dunham
ATTORNEYS Patented Oct. 4, 1938

2,132,360

UNITED STATES PATENT OFFICE 2,132,360

VAPORIZING AND OXIDIZING PHOSPHORUS

Milton H. Merchant, Woodbridge, N. J., assignor to The American Agricultural Chemical Company, Newark, N. J., a corporation of Delaware Application May 19, 1936, Serial No. 80,517

6 Claims. (Cl. 23—165)

This invention relates to the vaporization of elemental phosphorus and to the oxidation of the vapor. One object of the invention is to provide a process by which the vaporization and oxidation to pentoxide can be effected at high speed without the appearance of elemental phosphorus or any lower oxide thereof in the final product. To this and other ends the invention comprises the novel features hereinafter described.

In carrying out the invention in the preferred manner yellow phosphorus is melted and delivered to a vaporizing chamber heated to a temperature at least as high as the point at which any red phosphorus present vaporizes rapidly, say 400° C. The chamber temperature may, however, be much higher, and I prefer as much heat as the walls will stand. For this purpose it is desirable to construct the chamber, or line it, with refractory material. Ordinary firebrick has been found satisfactory, permitting a preferred temperature range of 800° to 1100° C. It is also desirable, for conserving heat, to insulate the chamber thoroughly, as by means of magnesia or cellular material. The phosphorus delivered into the highly heated atmosphere of the vaporizer flashes into vapor. Oxygen is also introduced into the vaporizer, but in amount insufficient to oxidize more than a minor part of the phosphorus vapor, preferably about a qurater of it, thereby producing a corresponding amount of one or more of the oxides of phosphorus, which, at the temperature of the vaporizing chamber, are in vapor form, and this temperature is maintained by the heat of the oxidizing reaction. There is thus produced a mixture containing the vapors of phosphorus and one or more oxides of phosphorus, and, of course, nitrogen also when an atmospheric air is introduced into the vaporizer to supply the oxygen.

From the vaporizer the mixture is discharged into an oxidizing chamber or burner to which air is supplied in amount at least sufficient to oxidize all the phosphorus; and any lower oxide thereof present, to pentoxide; and from this burner the latter compound is recovered in any suitable way, as by condensation in a suitable condenser into which the gases are delivered, or by conversion to phosphoric acid.

Convenient and efficient apparatus for practicing the process is illustrated in section in the accompanying drawing.

The vaporizing chamber is shown at 10, comprising a steel shell 11 lined with firebrick 12 and a heat-insulating layer 13. An inlet 14 for molten phosphorus, and at a remote point a separate inlet 15 for air under suitable pressure, are provided, also an outlet 16 for the mixed vapors generated in the vaporizing chamber. The outlet or discharge nozzle 16 opens into a horizontal chamber or burner 17 supplied with air through openings 18 from a manifold 19. The steel shell of the chamber 17 is lined with refractory material of high heat conductivity, for example, carborundum brick, and is provided with a cooling jacket 20 for water or other medium, to bring the heat of the gases down to a value at which the phosphoric oxide can be conveniently recovered as the oxide itself or as phosphoric acid.

In starting the process, air is introduced into the vaporizing chamber 10 by way of inlet 15 and into the burner 17 by the manifold 19, and molten phosphorus is delivered to the chamber through the inlet 14, slowly at first, say drop by drop, but at an increasing rate. As the drops fall into the air in the chamber they are oxidized and as the operation goes on the temperature in the chamber rises, eventually reaching a point at which, with the molten phosphorus supplied at the normal rate, all of the phosphorus, including any of the red variety that may be present, flashes into vapor. As the rate of phosphorus supply is increased the supply of air is also increased and in normal operation is maintained at about one fourth of the theoretical requirement for complete oxidation of the phosphorus. As the vapors issues from the outlet 16 into the oxidizing chamber or burner 17 the oxidation to phosphoric oxide, $P_2O_5$, is completed, and the latter compound, gradually cooled to a convenient temperature, passes on to the point of recovery, not shown.

As the air enters the vaporizing chamber the resulting flame, containing reacting (and reacted) phosphorus vapor and oxygen, originates at or near the air inlet and extends therefrom. The flame is coolest at the point where it originates and hottest at a point remote therefrom. The phosphorus enters the chamber and meets the heated atmosphere therein at one and the same point, and by proper regulation of the velocity of the air injected into the chamber the hottest part of the flame can be brought as near to the point of phosphorus supply as may be necessary to insure immediate vaporization of all the phosphorus and prevent the formation and accumulation of any red phosphorus since the temperature to which the phosphorus is subjected immediately upon entering the chamber is too high for red phosphorus to exist.

It is to be understood that the invention is not limited to the specific procedure herein described but can be practiced in other ways without departure from its spirit as defined by the appended claims.

I claim:—

1. In a process of burning phosphorus, the steps comprising establishing in a vaporizing chamber an atmosphere containing vapors of elemental and oxidized phosphorus; continuously injecting air into the chamber and at a remote point delivering molten phosphorus into the chamber; maintaining the air supply at such amount that the oxygen content thereof is only a minor part of the amount theoretically required for complete oxidation of all the phosphorus, and maintaining around the point of entry of the phorphorus an atmosphere still lower in ovygen at a temperature at which the phosphorus is flashed into vapor and the formation of a body of unvaporized phosphorus is prevented; discharging the vapors of elemental and oxidized phosphorus from the chamber; and completing the oxidation outside of the chamber by means of air separately supplied.

2. In a process of burning phosphorus, the steps comprising establishing in a vaporizing chamber an atmosphere containing vapors of elemental and oxidized phosphorus; continnously delivering molten phosphorus into the chamber and into immediate contact with the atmosphere therein; continuously injecting air into the chamber at a point remote from the point of delivery of the phosphorus and in such amount that the oxygen content of the air is only a minor part of the amount theoretically required for complete oxidation of all the phosphorus and providing thereby a flame containing reacting and reacted phosphorus and oxygen with its hottest part adjacent to the point of entry of the molten phosphorus to maintain around the incoming phosphorus an atmosphere still lower in oxygen at a temperature at which the incoming phosphorus is flashed into vapor and the formation of a body of unvaporized phosphorus is prevented; and discharging the vapors of elemental and oxidized phosphorus from the chamber.

3. In a process of burning phosphorus, the steps comprising establishing in a vaporizing chamber an atmosphere containing vapors of elemental and oxidized phosphorus; continuously delivering molten phosphorus into the chamber; continuously injecting air into the chamber at a remote point and providing thereby a flame containing reacting and reacted phosphorus and oxygen with its hottest part adjacent to the point of entry of the phosphorus; and maintaining the phosphorus and air supply in amounts such that the oxygen content of the air is only a minor part of the amount required for oxidation of all the phosphorus but is sufficient to maintain around the point of entry of the phosphorus an atmosphere still lower in oxygen and at a temperature at which all the phosphorus is vaporized without the formation of a body of liquid phosphorus.

4. In a process of burning phosphorus, the steps set forth in claim 1, in which the temperature of the atmosphere in the vaporizing chamber is not less than about 400° C. and not more than about 1100° C.

5. In a process of burning phosphorus, the steps set forth in claim 1, in which the temperature of the atmosphere in the vaporizing chamber in not less than about 800° C.

6. In a process of burning phosphorus, the steps set forth in claim 1, in which the oxygen content of the air supplied is about one-fourth of the amount theoretically required for complete oxidation of all the phosphorus delivered to the vaporizing chamber.

MILTON H. MERCHANT.